May 29, 1962  R. E. SMITH ET AL  3,036,598
DIGITAL VALVE

Filed Dec. 16, 1959  4 Sheets-Sheet 1

INVENTORS
ROBERT E. SMITH
JAMES D. JEWELL
BY *allan Rothenberg*

ATTORNEY

May 29, 1962    R. E. SMITH ETAL    3,036,598
DIGITAL VALVE

Filed Dec. 16, 1959    4 Sheets-Sheet 2

INVENTORS
ROBERT E. SMITH
JAMES D. JEWELL
BY
Allan Rothenberg
ATTORNEY

INVENTORS
ROBERT E. SMITH
JAMES D. JEWELL
BY
*Allan Rothenburg*
ATTORNEY

United States Patent Office
3,036,598
Patented May 29, 1962

3,036,598
DIGITAL VALVE
Robert E. Smith, Downey, and James D. Jewell, Fullerton, Calif., assignors to North American Aviation, Inc.
Filed Dec. 16, 1959, Ser. No. 859,883
11 Claims. (Cl. 137—623)

This invention relates to digtal valves, and particularly concerns a valve for effecting precision control of a fluid actuator in response to a digital signal.

In many different fields where mathematical computations are required to define a desired output, the use of digital computers is becoming of increasingly widespread application. In numerous types of computer controlled power devices, the desired output is a physical displacement of a driven member. Since the output of a digital computer is in digital form, as a series of discrete pulses, for example, some form of digital-to-analog converter is generally interposed between the computer output and the driven member. Digital-to-analog conversion may be achieved by conventional electrical conversion networks which produce an analog output to drive a proportional control valve of a fluid motor. Such networks and proportional valves are of limited precision and range and furthermore introduce added complexity with concomitant reduction of reliability. Pneumatic digital-to-analog summing devices have been proposed as described in the patent to R. C. O'Brien, No. 2,889,109, wherein a parallel digital input (a selected combination of digitally weighted signals) has the several digits thereof combined by a system of valves and levers to provide the desired analog output. The large number of valves, levers and associated components required in such an arrangement is highly undesirable from the point of view of expense, precision, complexity and reliability.

In conventional analog controlled hydraulic power drives, flow rates are used in a closed loop system. A pick-off on the driven member is used to provide a feedback signal which is compared with the command signal to obtain an error signal for the valve driving amplifier. In accordance with the direct digital drive of the present invention, an open loop system is provided wherein no feedback is necessary.

Accordingly, it is an object of this invention to provide a simple and reliable apparatus for effecting precision motion of a driven member under control of a digital signal. In carrying out the invention in accordance with a preferred form thereof, a fluid controlled actuator or fluid motor having a cylinder with a piston therein is operated by a control valve which will enable or block the passage of high pressure fluid (preferably a liquid) to the actuator. There is provided a metering device having an expandable chamber which is connected to the return port of the fluid actuator when the control valve is moved to its open position so that a fixed volume of fluid may be displaced by the piston to thereby precisely control the piston stroke. The control valve is operated from closed to open position with the use of a minimum of electrical power. The valve is normally held in closed position by a continuously energized magnet against the relatively small opening force exerted by a spring. To open the valve, the force of the magnet is momentarily decreased whereby the spring will move the valve to its open position wherein it is beyond the effective range of the continuously energized magnet. Recycling of the valve (return to closed position) is provided by a fluid pressure differential acting on the valve and initiated at the termination of the piston stroke by expansion of the metering chamber. Thus, little power is required to open the valve which does not work against fluid pressure at any time. Conversely, fluid pressure is utilized to close the valve. The metering device accurately controls the stroke of the actuator for each input pulse which momentarily disables the holding magnet so that each stroke is precisely equal to each other stroke. Additionally, the metering device itself controls the pressure actuated valve closing whereby he piston of the actuator is moved in precise discrete steps under control of a serial digital input of which each pulse will momentarily disable the holding magnet.

An object of this invention is the operation of a fluid control valve directly from a digital signal.

A further object of this invention is to provide actuation of a fluid motor under digital control and without the use of digital-to-analog components.

Still another object of the invention is to achieve precision control of a fluid actuator stroke.

A further object of this invention is the provision of an electrically controlled valve using a minimum of electrical power.

Still another object of the invention is to provide an electrically controlled valve wherein the valve driving forces are not provided by electrical power.

These and other objects of the invention will become apparent from the following description taken in connection with the accompanying drawings in which—

In the drawings, like reference characters refer to like parts.

Figure 1:
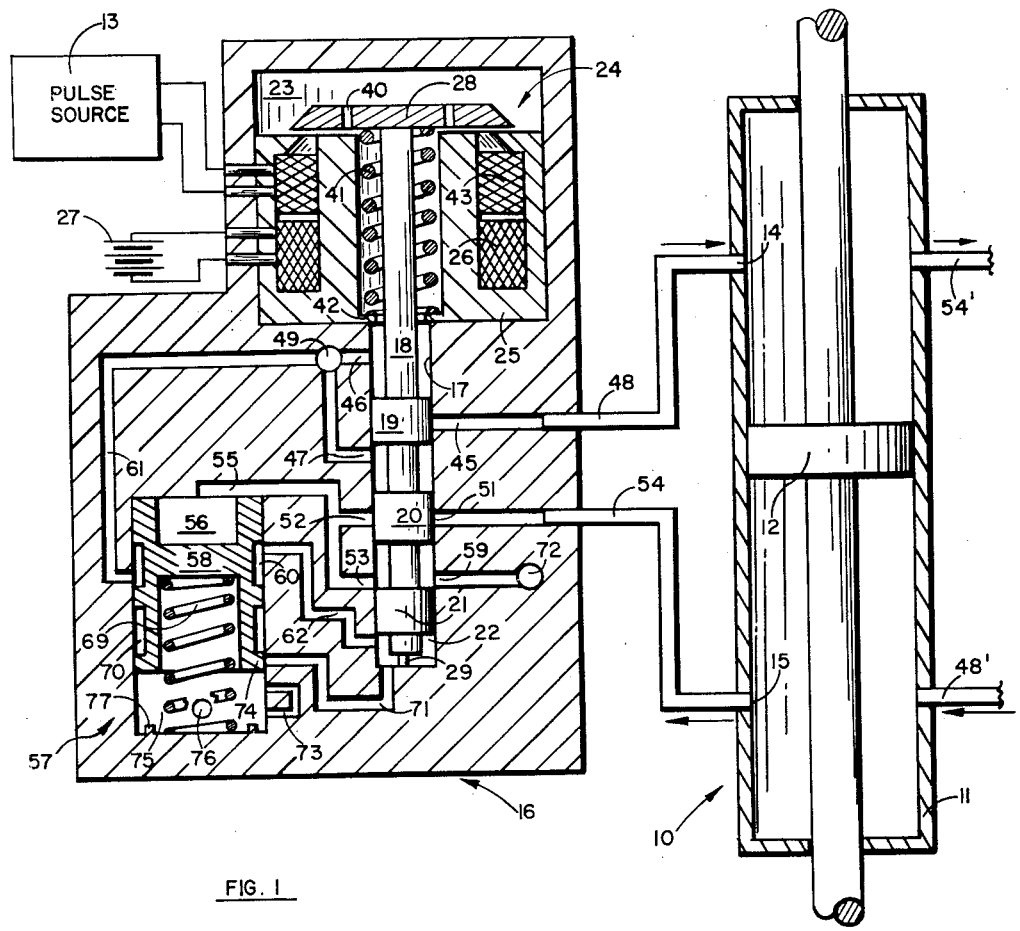
FIG. 1 illustrates a fluid controlled actuator coupled with a digitally-controlled valve constructed in accordance with the principles of this invention.

Illustrated in FIG. 1 is a fluid-controlled actuator, or fluid motor 10, having a cylinder 11 and piston 12 which is to be moved in precise proportion to the total of a number of pulses provided from digital computing apparatus such as the serial digital output of a digital control source indicated at 13. The cylinder 11 has input and return ports 14 and 15 arranged so that fluid, under pressure supplied through port 14, will drive piston 12 downwardly in the illustration to exhaust displaced fluid through return port 15. The fluid flow to and from ports 14 and 15 is under the control of the digital valve of this invention.

The illustrated digital valve comprises an outer casing or body 16 having a substantially cylindrical bore 17 in which is slidaby mounted a multilobed valve core or spool 18 having valve lobes 19, 20 and 21. The arrangement is such that there is provided at each end of the casing, between the casing and the valve core, a pair of chambers 22 and 23. Mounted within the upper, high pressure chamber 23, and secured to the casing, is an electromagnet assembly 24, including an annular magnetic core 25, having a holding coil 26 wound thereon and connected to be continuously energized from a suitable source of electrical potential 27. Fixedly secured to the upper end of the stem of the valve 18 is a disc-shaped armature 28 of high magnetic permeability. In the closed position of the valve illustrated in FIG. 1, the magnetic armature 28 is in close proximity to the magnetic core 25 and thus is captured and held in this position by the energization of the coil 26. The magnet may have a volume on the order of one cubic inch whereby it can exert a holding force on the order of 40 pounds. The armature 28 in closed position of the valve is slightly spaced from the magnet core by suitable spacing means such as a protrusion 29 at the lower end of the valve core which is arranged to abut the lower end of the casing within the variable pressure chamber 22. Preferably the armature 28 is perforated by apertures 40 whereby equal pressure on both sides of the armature is insured when the valve is in closed position. A spring 41, concentric with the stem of the valve core is compressed in closed position of the valve between a shoulder 42 on the valve casing and the armature 28. The amount of compressive force exerted by the spring (on the order of 15 to 20 pounds, for example) in a direction tending to open the valve is substantially less than closing force generated by the continuously energized magnet holding coil so that the valve may be normally held in closed position against the operation or force exerted by the spring.

Figures 2, 3:
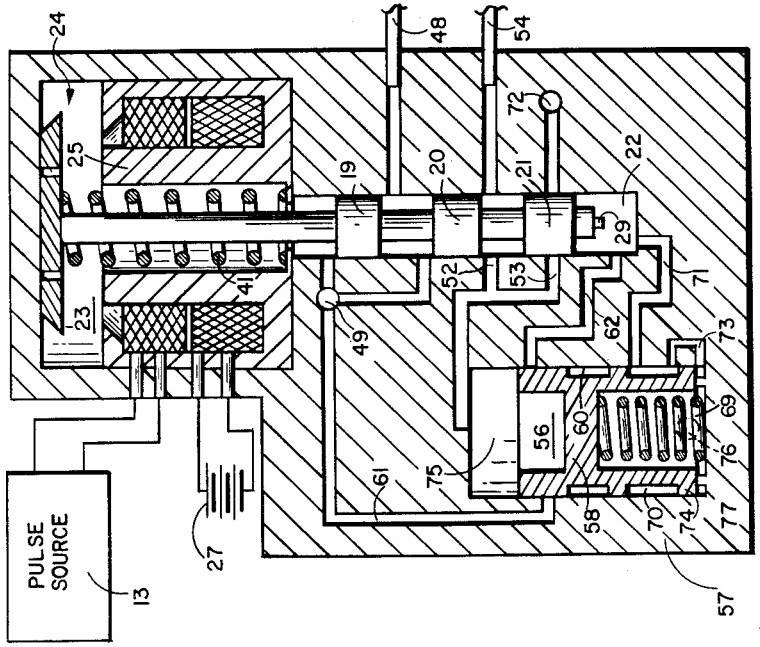
FIGS. 2 and 3 illustrate the apparatus of FIG. 1 in an intermediate and limit position thereof, respectively.

In the closed position illustrated in FIG. 1, both the high pressure chamber 23 and the variable pressure chamber 22 are connected to an external source of high pressure hydraulic fluid by means which will be detailed in connection with the description of the valve porting. Also wound upon the magnet core 25 is a pulsing coil 43 connected for operation by pulses from the source 13 so that each pulse will cause the pulsing coil 43 to exert a component of magnetic force in opposition to that exerted by the holding coil 26. That is to say, momentary energization of pulsing coil 43 will decrease the holding flux in the core 25 to an extent sufficient to allow spring 41 to snap the armature 28, together with the valve core 18 to the open position thereof as illustrated in FIGS. 2 and 3. In such position, the armature is beyond the effective range of the magnetic force exerted by the holding coil 26 which force, as is well known, decreases rapidly with increase in gap length. The valve will remain in this open position of FIG. 3 until the pressure in variable pressure chamber 22 is decreased by means hereinafter described whereby the force exerted by the pressure differential between high pressure chamber 23 and variable pressure chamber 22 may drive the valve back to its closed position.

The valve casing has a plurality of high pressure ports 45, 46 and 47 of which port 45 is connected with input port 14 of the actuator by a conduit 48 while ports 46 and 47 are each connected to a main valve input port 49. Input port 49 is arranged for connection with a suitable source of pressure not shown. A relief port 59 is connected to a main relief port 72 which is arranged for connection to the sump. The valve casing also has a number of return ports 51, 52 and 53. Port 51 is connected by conduit 54 to the return port 15 of actuator 10 while ports 52 and 53 are connected together and, by conduit 55, to the interior of an expansible chamber 56 of a metering device 57.

Metering device 57 includes a casing which may be formed as a chamber integral with and within the valve body 16 and has a piston 58 slidably mounted therein. A compression spring 69 is interposed between the bottom of the chamber of the metering device and the lower side of the piston 58 to urge the latter to the position illustrated in FIG. 1. The piston 58 is both an actuated piston and a valve core or spool. It is provided with an annular port or reduced diameter portion 60 communicating (in the position of FIG. 1) at one side thereof with high pressure input port 49 via conduit 61 and at the other side thereof with the variable pressure chamber 22 via high pressure conduit 62. Piston 58 has a second annular port 70 arranged so as to provide fluid communication between variable pressure chamber 22 and the sump at the end of the actuator stroke. A second connection between the metering device 57 and chamber 22 is provided by conduit 71. The metering device has a conduit 73 bridging a lower valve lobe 74 of piston 58 so as to provide communication between conduit 71 and the relief chamber 75 of the metering device at the lower side of piston 58. Relief chamber 75 is provided with a port 76 arranged for connection at all times to the sump.

In the closed position of the valve illustrated in FIG. 1, both the input and return ports of the actuator are closed by lobes 19 and 20 respectively which are situated to block the valve ports 45 and 51. Port 49, the high pressure valve input, is always open as are ports 46, the input to the high pressure chamber 23 and port 47, the high pressure input to the control valve. Port 52 which communicates with the chamber 56 of the metering device 57 is colsed by lobe 20. The variable pressure chamber 22 is in communication with the main high pressure input port 49 by means of conduit 62, annular port 60 of the metering device, and conduit 61. Therefore, no net pressure is acting at this time axially of the valve core 18. Expansible chamber 56 is connected to sump port 72 via conduits 55, 53 and port 59. Conduit 71 is colsed by lobe 74 of the metering piston.

Referring now to FIG. 2, the valve is shown in intermediate position which is the first step in the sequence of the complete valve operation cycle. Upon receipt of a signal from source 13, a current pulse of short time duration is delivered to the pulsing coil 43 in a direction and of a magnitude which is sufficient to momentarily decrease the magnetic field due to the constant current holding coil 26 whereby the armature 28 is released. The compressed spring 41 then snaps the valve core 18 into the open position illustrated in FIG. 2 with the armature 28 positioned at a distance from the magnet core 25 such that the field strength of the holding magnet (even after termination of the pulse to coil 43) is not sufficient to attract the armature against the spring pressure. Therefore, the valve core will remain in the illustrated released position. During this motion of the valve core 18 from closed to open position, ports 53 and 59 are first closed by lobe 21 to prevent fluid which is discharged from actuator port 15 from returning to the sump through ports 51 and 52 which are now no longer closed by lobe 20. Port 45 is no longer closed by lobe 19. Pressure is applied to the actuator via ports 47 and 45. Fluid discharged from actuator port 15 is permitted to flow into the chamber 56 of metering device 57 via conduit 54, ports 51, 52 and conduit 55. The fluid discharged by the actuator, which is operated by the fluid pressure supplied through port 47 and the now open pressure port 45, can escape only into the metering chamber 56. Fluid communicated to the chamber 56 will effect a motion of the piston 58 downwardly to a limit position wherein the bottom portion of the piston will abut against the lower end of the metering chamber or suitable stop members 77. Thus, it will be seen that the volumetric expansion of the expansible metering chamber is a fixed amount whereby the stroke of actuator piston 12 is precisely controlled by the limited expansion of the metering device. A command pulse has now been received, a precise increment of actuator stroke has been achieved, and the apparatus assumes the position illustrated in FIG. 3 which enables the generation of a fluid pressure differential on the valve core 18 sufficient to recycle the valve and drive the latter to its closed position once more.

As illustrated in FIG. 3, the recycling pressure differential is achieved under the control of port 70 of piston 58. At the end of the downward stroke of piston 58, the upper arm of bridging conduit 73 comes into communication with port 70 and is thereby connected with variable pressure chamber 22 via conduit 71 which is also connected to port 70. High pressure ports 61 and 62 are blocked by piston 58. Therefore, chamber 22 is connected to the sump via ports 76 and 70 and conduits 73 and 71. The pressure differential between high pressure valve chamber 23 and the now low pressure chamber 22 operates to return the valve spool 18 to its closed position illustrated in FIG. 1.

When the spool 18 returns to its closed position, pressure in expansible metering chamber 56 is relieved via conduit 55, 53 and ports 59, 72 whereby spring 69 returns piston 58 to the position illustrated in FIG. 1. The apparatus is now completely recycled and ready to accept another command pulse.

It will be seen that the magnet never performs more than a mere holding function. All energy required to move the valve core is derived from the spring 41 in the opening operation and derived from the hydraulic fluid source in the closing operation. Relatively little power is required by the pulsing coil 43 whereby relatively few turns of wire are required for this coil. The rapid build up and decay of current in the pulsing coil 43 which is demanded for satisfactory operation up to frequencies of 100 cycles per second, for example, is thus greatly facilitated since coil inductance is proportional to the square of the number of turns in the coil. The operation is completely on-off. The stroke of the valve core may be on the order of one-eighth inches, it being noted that the illustrations of the described embodiments are made to approximately twice full scale. This relatively long stroke and the on-off nature of operation preclude the necessity for precision location of ports such as is required in conventional proportional control valves.

It will be seen that the apparatus described up to this point is capable of operating the actuator piston 12 in but a single direction. Those skilled in the art will readily appreciate that bi-directional operation may be achieved most conveniently by completely duplicating the control valve and metering arrangement to effect operation in response to digital signals commanding motion in the opposite direction. For such an arrangement (FIG. 1), the actuator cylinder 11 will be provided with additional pressure and return ports and conduits 48' and 54' for connection to a valve identical to that illustrated, with conduit 54' being connected to the second valve as is conduit 54 and conduit 48' being connected to the second digital valve as is conduit 48.

Figure 4:
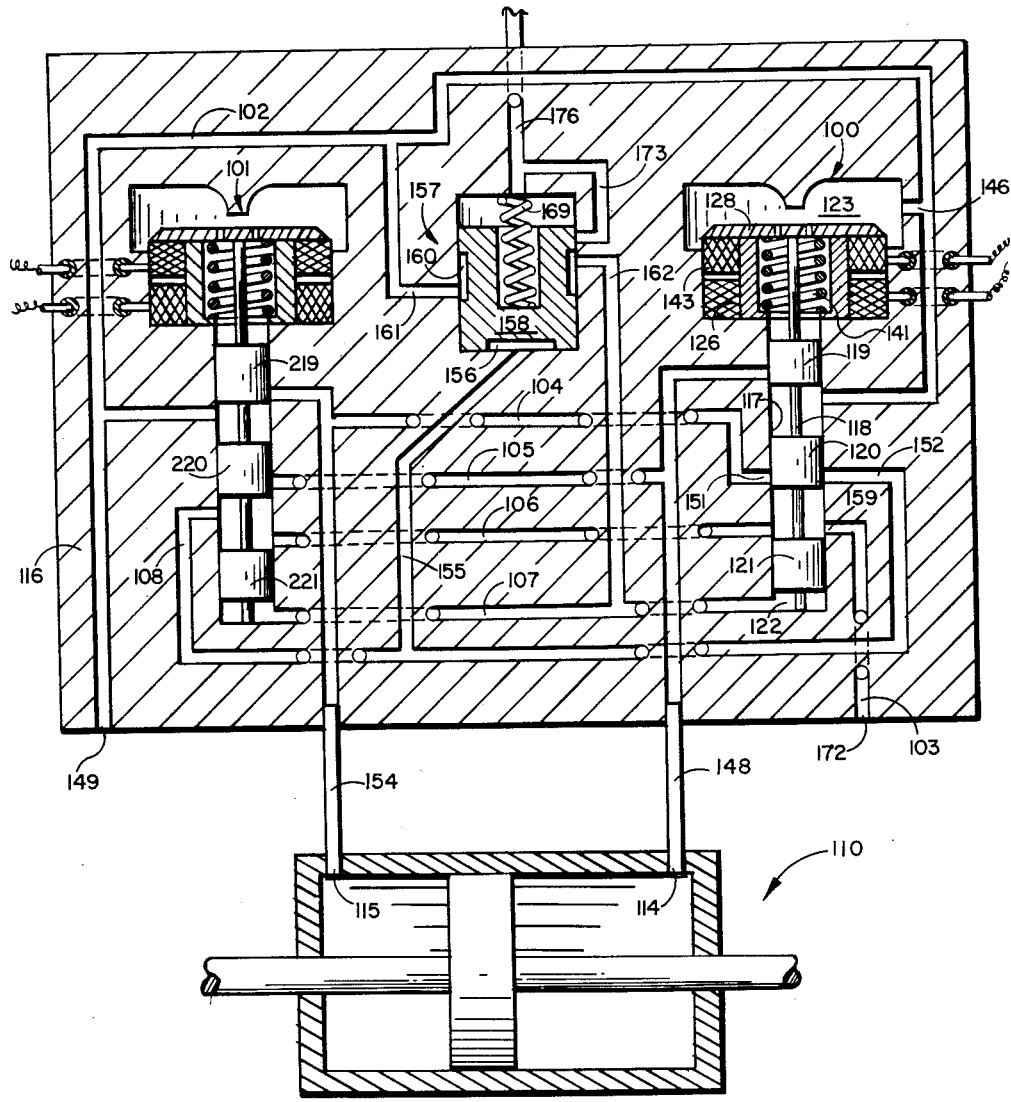
FIGS. 4 and 5 illustrate a second embodiment of the invention in different positions thereof.
Figure 5:
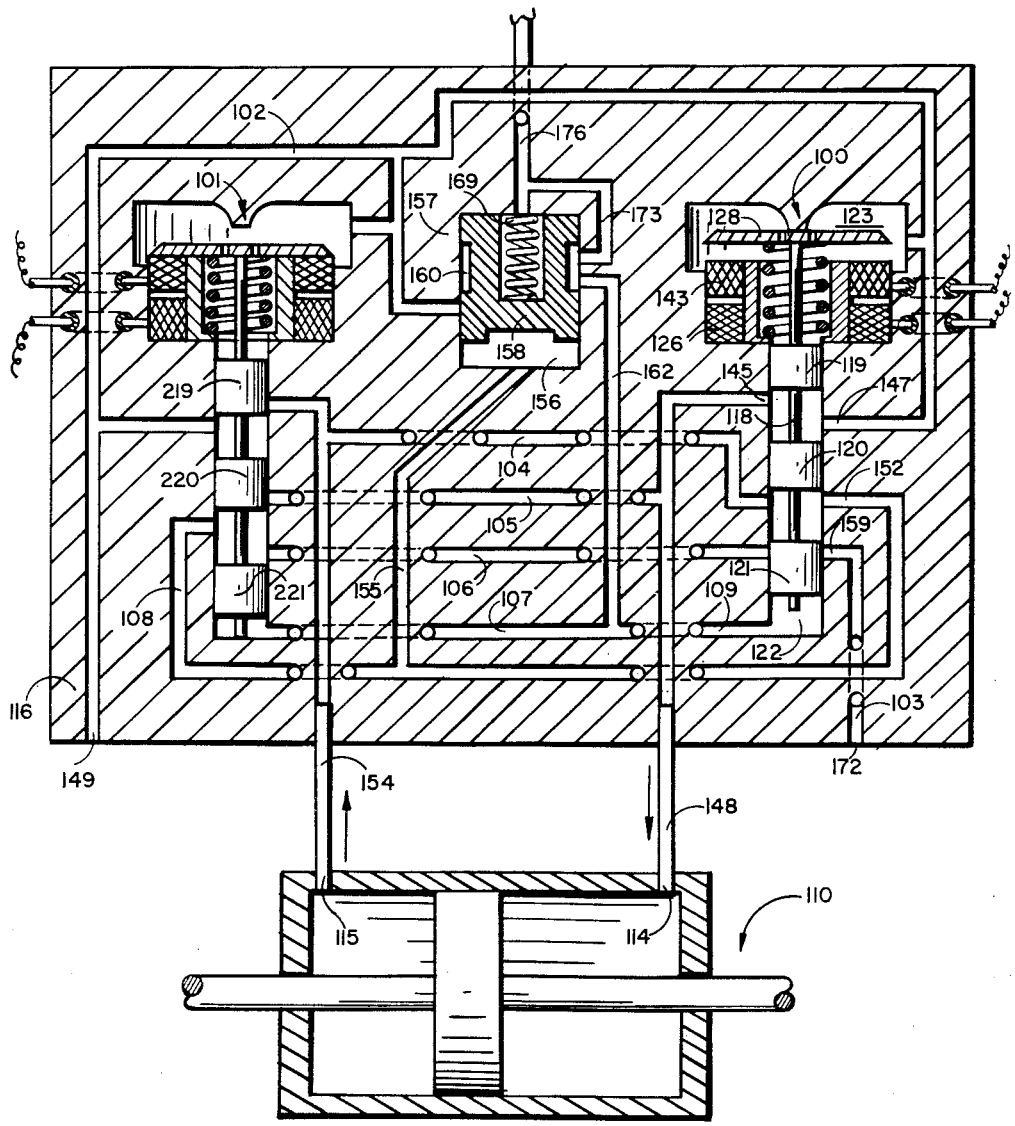

FIGS. 4 and 5 illustrate a modification of the digital valve of FIG. 1 wherein bi-directional actuation is achieved by a pair of identical control valves 100, 101, sharing a common metering device 157. In FIGS. 4 and 5, parts structurally or functionally similar to parts of the embodiment of FIG. 1 are designated by the same reference numerals, prefixed, however, by a 1 or 2. For example, numerals 19, 119 and 219 each denotes a functionally similar valve lobe.

For operation of an actuator 110 in one direction (motion of the piston thereof to the left in FIG. 4) control valve 100 is pulsed and operates together with the metering device 157 substantially as described in the previous embodiment, while the control valve 101 remains in the inoperable closed position. Conversely, for operation of the actuator 110 in the opposite direction (motion of the piston to the right), control valve 101 is pulsed and operates together with the metering device 157 while the control valve 100 remains closed. The two valves will be operated alternatively, one by a first pulse train commanding motion in one direction, and the other by a second pulse train commanding motion in the other direction. Both of the control valves 100, 101, metering device 157, and the several interconnecting conduits are mounted in a suitable valve casing 116. Control valve 100 comprises a substantially cylindrical bore 117 in which is mounted a valve spool 118 having lobes 119, 120, and 121. The upper end of the bore 117 is enlarged to provide for mounting of holding coil 126, pulsing coil 143, spring 141, and armature 128, all substantially arranged and functioning as are the corresponding elements of the embodiment of FIG. 1. An upper or high pressure chamber 123 is provided which, as previously described, is always supplied with a high pressure, while a variable pressure chamber 122 is provided between the lower end of the valve spool and the cylindrical bore 117.

The metering device 157, while functionally similar to element 57 of FIG. 1, is somewhat different structurally. It includes a chamber formed within the valve casing 116 in which is slidably mounted a substantially U-shaped metering piston 158 to provide an expansible metering chamber 156 between the bottom of the piston and the chamber in which the piston is slidably mounted. Spring 169 is provided to urge the piston 158 to its deactivated position illustrated in FIG. 4. The piston 158 also operates as a valve and has a reduced diameter portion, or port 160, and a bridging conduit 173 for coupling the port 160 of the piston to the interior of the piston chamber at the upper side of the piston. This portion of the chamber is coupled at all times to the sump (not shown) by the conduit 176.

The apparatus, as illustrated in FIG. 4, is in a deactivated position. Operation of this bi-directional valve system will now be described in connection with a single cycle of the valve 100 which causes the piston of actuator 110 to move a predetermined increment to the left. During all of this operation, control valve 101 will remain in its closed position, illustrated in FIG. 4. High pressure is supplied at all times to the high pressure port 149 of the valve (from a suitable source, not shown) and thus maintains a high pressure in upper chamber 123 by means of a conduit 102 and port 146. In the closed position of control valve 100, illustrated in FIG. 4, high pressure to port 114 of actuator 110 is blocked by lobe 119 which closes a conduit 148 connected between the control valve 100 and the actuator port 114. The port 115 of the actuator, connected to conduits 104, 154, is blocked at port 151 of the valve by lobe 120 in closed position. High pressure is applied to variable pressure chamber 122 via port 149, conduit 102, port 160 of the metering piston, and conduit 162. Thus, equal pressure is provided at each end of the valve spool 118. The upper side of the metering chamber of metering device 157 is connected at all times to the sump by conduit 176. The expansible chamber 156 is at this time also connected to the sump through conduits 155, 108, control valve 101 (between lobes 220 and 221), conduit 106, port 159 of the control valve 100, and conduit 103 which at all times is connected to the sump via port 172. Port 152, connected to conduit 155, is closed by lobe 120. Thus, there is no differential pressure across the piston 158 and spring 169 holds it in its lower position illustrated in FIG. 4.

Upon receipt of a single pulse by the coil 143, spring 141 snaps the valve core 118 to its open position as illustrated in FIG. 5. Metering piston 158 has not yet moved from its lower limit position to the position of FIG. 5. High pressure is supplied to the actuator port 114 via conduit 148, valve port 145 which is now open, valve port 147 and conduit 102. The high pressure in variable pressure chamber 122 and conduit 162 is retained until the metering piston 158 reaches the upper limit position thereof. The metering piston 158 is moved from its lower position to its upper position upon motion of the piston of the actuator 110 toward the left. Upon such motion, fluid is exhausted from the actuator cylinder and supplied via conduits 154, 104, ports 151 and 152 (no longer blocked by lobe 120) and conduit 155 to the expansible metering chamber 156. This return fluid actuates metering piston 158 to its upper position illustrated in FIG. 5. When the valve core 118 moved to its open position, the sump relief conduit 103 was blocked by valve lobe 121 whereby the expansible chamber 156 was no longer relieved to the sump by the path including conduits 155, 108, 106 and port 159.

When metering piston 158 reaches its upper limit position, return fluid can no longer be exhausted from the actuator cylinder which is thus locked in position after moving a predetermined increment of distance to the left. However, when the metering piston 158 is in its upper limit position, as illustrated in FIG. 5, the lower arm of bridging conduit 173 is connected to the port 160. Since the conduit 162, connected to the variable pressure chamber 122, is at all times connected to port 160, the variable pressure chamber is now relieved by connection to the sump. With relief of variable pressure chamber 122, a pressure differential is created across the valve spool 118 since upper chamber 123 is connected to high pressure at all times. The valve spool is therefore moved to its closed position as illustrated in FIG. 1. When the valve spool returns to its closed position, the expansible chamber 156 is no longer connected to the return conduit 154 of actuator 110 since ports 151 and 152 are closed by lobe 120. The expansible chamber 156 is now relieved via port 172, conduit 103, port 159 (which opens when the valve core 118 moves to its closed position), and conduits 106, 108 and 155. The upper side of piston 158 is always connected to the sump by conduit 176. Upon relief of expansible chamber 156 to the sump, spring 169 moves the piston 158 from the upper position of FIG. 5 to the lower position of FIG. 4 and a full cycle has been completed.

The two control valves 100 and 101 are substantially symmetrically arranged with respect to the several interconnecting conduits so that operation of control valve 101 in response to its pulsing coil will be identical to the described operation of control valve 100 with the exception of course, that high pressure will be supplied from valve 101 to conduit 154 while fluid exhausted from the actuator will be returned through conduits 148, 105 through control valve 101 and conduits 108, 155 to the expansible chamber 156. A lack of symmetry does exist, however, in the relief of chamber 156 to sump. This relief path remains the same for operation of either valve 100 or 101, always comprising conduits 155, 103, 106 and 103. Conduit 104 is operable when control valve 100 is actuated so as to connect exhaust fluid from conduit 154 to port 151. Conduit 105, connected between valve 101 and conduit 148, is the counter part (for control valve 101) of conduit 104 and is operable upon operation of control valve 101 to connect fluid now exhausted through conduit 148 to the control valve 101 and thence via conduit 108 and common conduit 155 to the metering chamber 156. Conduits 107 and 109 are two branches of conduit 162, arranged to connect the latter to the variable pressure chambers of control valves 101 and 100, respectively, so that both variable pressure chambers are controlled by the common metering device.

It will be readily appreciated that there has been described a novel digital valve which is capable of precision open loop operation under the direct control of a digital input signal. An efficient valve actuation is provided, utilizing a minimum of electrical power while at the same time each increment of actuator piston output motion is precisely controlled to be of equal value for each input pulse by means of the metering of the actuator return fluid. Efficiency and simplicity of the mechanism is insured by utilizing the metering device itself to control the pressure actuated recycling of the valve.

Although the invention has been described and illustrated in detail, it is to be clearly understood that the same is by way of illustration and example only and is not to be taken by way of limitation, the spirit and scope of this invention being applicable to a variety of other embodiments.

We claim:

1. A digital valve comprising a valve body having first (147) and second (145) pressure ports for respective connection with a source (149) of fluid pressure and a pressure input port (114) of an actuator to be controlled by said valve, said body having a first return port (151) for connection with a return port (154) of said actuator and having second (152) and third (159) return ports, a valve core (118) slidably mounted in said casing for movement between closed and open positions, said core having a first lobe (119) situated to block and enable fluid flow between said first and second pressure ports in closed and open core positions respectively, said core having a second lobe (120) situated to block and enable fluid flow between said first (151) and second (152) return ports in closed and open core positions respectively, a metering cylinder, a piston (158) mounted in said cylinder for a predetermined amount of movement between first and second positions, a conduit (155 and 108, 106) connecting said second (152) and third (159) return ports to said cylinder at one end of said piston, said third (159) return port being in communication with a sump connecting port (172), said core having a third lobe (121) situated to enable and block said third (159) return port in closed and open core positions respectively, said body having first and second pressurized chambers (122, 123) each at a respective end of said core, and means responsive to move of said piston for changing the pressure in one of said chambers.

2. The structure of claim 1 wherein said means for changing pressure comprises a reduced diameter portion (160) on said piston having first (161) and second (162) conduits respectively connecting with said source (149) of pressure and one (122) of said pressurized chambers in said first piston position, and a bridging (173) conduit connected to said metering cylinder and adapted for communication with said sump, said piston portion being situated so as to cause said piston to block said first (161) conduit and interconnect said bridging (173) and second (162) conduits in said second piston position.

3. Apparatus for operating a fluid controlled actuator having input and return ports comprising in combination: a control valve having high pressure input and output ports for connection respectively with a source of fluid pressure and said actuator input port, means for operating said control valve to provide a fluid path between said control valve ports, a metering device having an expandable chamber, means responsive to said operation of said control valve for coupling said return port to said chamber, and means for recycling said apparatus.

4. Apparatus for operating a fluid controlled actuator having first and second ports comprising in combination: a first control valve having high pressure input and output ports for connection with a source of fluid pressure and said first actuator port respectively, means for operating said control valve to provide a fluid path between said control valve ports, a metering device having an expandable chamber, means responsive to said operation of said control valve for coupling said second port to said chamber, a second control valve having high pressure input and output ports for connection with said source of fluid pressure and said second actuator port respectively, means for operating said second valve to provide a fluid path between said second control valve ports, and means responsive to operation of said second control valve for coupling said first actuator port to said chamber.

5. A digital valve for operating a fluid controlled actuator having input and return ports comprising in combination, control valve means operable between closed and open positions thereof for respectively closing and opening said input port, means for operating said valve means to said open position, and recycling means responsive to a predetermined amount of flow from said return port for operating said valve means to said closed position.

6. A digital valve system for operating a fluid controlled actuator having first and second ports comprising in combination: first control valve means operable between closed and open positions thereof for respectively blocking and enabling fluid communication between a source of fluid pressure and said first actuator port; second control valve means operable between closed and open positions thereof for respectively blocking and enabling fluid communication between said source of pressure and said second actuator port independently of said first valve means; recycling means responsive to exhaust of a predetermined amount of fluid from said second actuator port for closing said first valve means and responsive to exhaust of a predetermined amount of fluid from said first actuator port for closing said second valve means.

7. A digital valve for operating a fluid controlled actuator having input and return ports comprising in combination: control valve means operable between closed and open positions thereof for respectively closing and opening said input port, means for operating said valve means to said open position, and recycling means responsive to a predetermined amount of flow from said return port for operating said valve means to said closed position, said recycling means comprising an expandable chamber, means responsive to operation of said valve means to open position for coupling said return port to said chamber, and means responsive to expansion of said chamber for shifting said valve means to said closed position.

8. A digital valve for operating a fluid controlled actuator having input and return ports comprising in combination control valve means having a spool operable between closed and open positions thereof for respectively closing and opening said input ports, means for operating said spool to said open position, and recycling means responsive to a predetermined amount of flow from said return port for operating said spool to said closed position, said recycling means comprising an expandable chamber, means responsive to operation of said spool to open position for coupling said return port to said chamber, said valve means having first and second pressure chambers at opposite ends of said spool, means for coupling one of said pressure chambers to a source of high pressure, said expandable chamber including movable piston means operable in one position thereof for coupling said other pressure chamber to a high pressure and operable in another position thereof for coupling said other pressure chamber to a source of low pressure.

9. A digital vave for operating a fluid controlled actuator having input and return ports comprising in combination: control valve means having a spool with a first lobe operable between closed and open positions thereof for respectively closing and opening said input port, said valve means having first and second pressure chambers at opposite ends of said spool and means for coupling said first chamber to a high pressure source, means for operating said spool to said one position, a metering chamber having a piston mounted therein for movement between first and second limit positions, conduit means connected through said valve means between said metering chamber and return port, said spool having a second lobe situated to close and open said conduit means in closed and open spool positions respectively, a high pressure conduit connected to said metering chamber, a low pressure conduit connected to said metering chamber, a valve control conduit connected between said metering chamber and said second pressure chamber, said piston including means for interconnecting said valve control and high pressure conduits in the first piston position and interconnecting said valve control and low pressure conduits in said second piston position.

10. A digital valve for operating a fluid controlled actuator having input and return ports comprising a closed casing having input and output pressure ports and input and output return ports, a valve core mounted in said casing for movement between closed and open positions wherein fluid communication between said pressure ports and between said return ports is respectively blocked and enabled, first means for forcing said core to closed position, second means for exerting upon said core on opening force substantially smaller than the force exerted by first means, third means for momentarily decreasing the force exerted by said first means, a conduit coupling said output pressure port to said actuator input port, a conduit coupling said input return port to said actuator return port, a metering device having an expandable chamber, a conduit coupling said output return port with said expandable chamber, and means responsive to expansion of said chamber for providing a net fluid pressure on said core in a sense to force said core to closed position.

11. A digital valve comprising a casing having input and output pressure ports and input and output return ports, a valve core mounted in said casing for movement between closed and open positions wherein fluid communication between said pressure ports and between said return ports is respectively blocked and enabled, a magnetic armature fixed to said core, a first magnet for producing a substantially constant yield of finite effective range to hold said armature and valve core in said closed position, resilient means for urging said armature toward open position and beyond said effective range with a force substantially less than the force of said magnetic field, a second magnet for producing a field in opposition to said first-mentioned field, means for effecting momentary energization of said second magnet, and means responsive to a predetermined amount of fluid flow through one of said return and pressure ports for shift said core to closed position.

References Cited in the file of this patent
UNITED STATES PATENTS

| | | |
|---|---|---|
| 1,200,826 | Forman | Oct. 10, 1916 |
| 1,718,673 | Wettstein | June 25, 1929 |
| 2,210,916 | Kenyon et al. | Aug. 13, 1940 |
| 2,407,184 | Sparrow | Sept. 3, 1946 |
| 2,655,132 | Scheib | Oct. 13, 1953 |